United States Patent [19]
Wilkie

[11] Patent Number: 5,457,164
[45] Date of Patent: Oct. 10, 1995

[54] FIRE RETARDANT POLYMERIC RESIN COMPRISING POLYMERIC RESINS HAVING GRAFTED THEREON SALTS OF ACIDIC MONOMERS

[75] Inventor: Charles A. Wilkie, Brookfield, Wis.

[73] Assignee: Marquette University, Milwaukee, Wis.

[21] Appl. No.: 246,675

[22] Filed: May 20, 1994

[51] Int. Cl.$^6$ ............................... C08C 19/36; C08F 8/44
[52] U.S. Cl. ................... 525/367; 525/340; 525/366; 525/353; 525/386
[58] Field of Search .................... 525/340, 366, 525/367, 353, 386

[56] References Cited

U.S. PATENT DOCUMENTS

| | | | |
|---|---|---|---|
| 3,997,815 | 12/1976 | Kosaka et al. | 526/14 |
| 4,551,527 | 11/1985 | Halpern et al. | 524/118 |
| 4,581,409 | 4/1986 | Zabrocki et al. | 525/72 |
| 4,600,747 | 7/1986 | Zabrocki et al. | 525/74 |
| 5,219,907 | 6/1993 | Niessner et al. | 525/72 |

OTHER PUBLICATIONS

Factor, A., The Chemistry of Polymer Burning and Flame Retardance, *J. Chem Ed*, pp. 453–456 (1994).
McNeill, I. C. Degradation of Polymers of Methacrylic Acid Salts and Copolymers of These Salts with Methyl Methacrylate, *Dev Polym Sci*, 7:1–33 (1987).
McNeill, I. C., and Zulfiqar, M., Thermal Degradation of Ammonium Polymethacrylate and Polymethacrylamide, *J Polym Sci*, 16:2465–2474 (1978).
McNeill, I. C., and Zulfiqar, M., Preparation and Degradation of Salts of Poly(methyacrylic Acid).I. Lithium, Sodium, Potassium, and Caesium Salts, *J Polym Sci* 16:3201–3212 (1978).
Granzow, A., Flame Retardation by Phosphorus Compounds, *Accts Chem Res* 11:177–183 (1978).
Granzow, A., and Cannelongo, J. F., The Effect of Red Phosphorus on the Flammability of Poly(ethylene Terephthalate), *J Appl Polym Sci*, 20:689–701 (1976).
Granzow, A., Ferrillo, R. G., and Wilson, A., The Effect of Elemental Red Phosphorus on the Thermal Degradation of Poly(ethylene Terephthalate), *J. Appl Polym Sci*, 21:1687–1697 (1977).
McNeill, I. C., and Zulfiqar, M., Preparation and Degradation of Salts of Poly(Methacrylic Acid) Part II: Magnesium, Calcium, Strontium and Barium Salts, *Polym Degrad Stab*, 1:89–104 (1979).
Odian, G. in *Principles of Polymerization*, 3rd Ed., Wiley–Interscience, pp. 719–745 (1991).
Hebeish, A., Shalaby, S. E., and Bayzeed, A. M., Vinyl Graft Copolymerization onto Poly(Ethylene Terephthalate) Fibers, *kolorisztikai Ertesito*, 2:74–94 (1979).
Tealdo, G. C., Munari, S., and Calgari, S., Innesto mediante radiazioni ionizzanti de acido acrillico su polietiletereftalato, *Chim Ind* (Milan), 52:759–764 (1970).
Okada, T., and Sakadur, I., Radiation–Induced Graft Copolymerization to Polyester VI. Properties of Acrylic Acid Graft Drawn Polyester Fibers Prepared by Irradiation at Elevated Temperature, *Nippon Genshiyoku Kenkyusho Nempo*, JAERI, 5026:46 . 51 (1970).
Okada, T., and Sakadur, I., Radiation–Induced Graft Copolymerization to Polyester IV. Grafting of Acrylic Acid to Polyethylene Terphthalate Fiber with Impregnation Method at Room Temperature, *Nippon Genshiyoku Kenkyusho Nempo*, JAERI, 5026:56–62 (1970).
Bottom, R. A., Green, P., and Guthrie, J. T., The Photochemically Induced Grafting of 2–Hydroxyethyl Acrylate onto Regenerated Cellulose Films from Aqueous Solutions, *Polym Photochem*, 6:111–123 (1985).
Geuskens, G., and Kanda, M. N., Surface Modification of Polymers–I. Grafting Initiated by photo–generated hydroperoxides, *Eur Polym J*, 27:877–879 (1991).
Geuskens, G., and Thiriaux, Ph., Surface Modification of Polymers–II. Photo–Oxidation of SBS Containing Anthracene and Grafting Initiated by Photo–Generated Hydroperoxides, *Eur Polym J*, 29:351–355 (1993).
Abdel–Razik, E. A., Photoinduced graft copolymerization of acrylamide onto styrene–butadiene–acrylonitrile copolymer. *Photochem Photobiol A Chem*, 69:121–124 (1992).

*Primary Examiner*—Thomas Hamilton, III
*Attorney, Agent, or Firm*—Rogers, Howell & Haferkamp

[57] ABSTRACT

A fire retardant polymeric resin is disclosed. The resin comprises a polymer having grafted thereto a fire retardant effective amount of a monomer composition selected from among salts of acidic monomers, mixtures of salts of acidic monomers, and mixtures of acidic monomers and salts thereof. Related additives are also disclosed.

20 Claims, 6 Drawing Sheets

FIRE RETARDANT POLYMERIC RESIN COMPRISING POLYMERIC RESINS HAVING GRAFTED THEREON SALTS OF ACIDIC MONOMERS

BACKGROUND OF THE INVENTION (1) Field of the Invention

The present invention relates to fire retardant compositions, and more particularly to fire retardant compositions comprising the salt of an acidic monomer grafted onto a polymer substrate.

(2) Description of the Prior Art

Potential flammability is a problem associated with virtually all polymers. This is especially significant because of the widespread use of polymers such as synthetic fabrics and plastics. Because of the versatility of polymers such as plastics, these materials have found a place in nearly every aspect of daily living. Many of the applications of plastics involve a substantial fire hazard and as a result, the formulation of materials that minimize the risk of fire is of great importance.

A number of approaches to flame retardation of a polymeric material have been tried, none of which is totally satisfactory. Such approaches include addition of a substance that will cause the degradation pathway to change so that volatile gases are not produced; addition of a substance that is effective in the gas phase to remove the species responsible for the flame; and addition of a material that will decompose endothermically and thus remove heat from the system.

Methods involving the addition of substances to change the degradation pathway can be cumbersome or of limited application since they require that enough information be known about the effects of different additives on a specific polymer in order to design a suitable additive for that polymer. The information that is developed for one polymer generally cannot be extended to other polymers.

Gas-phase additives such as halogen-containing compounds are well known to extinguish the fire by interacting in the gas phase with the radicals that make up the flame. This approach to flame retardation has the advantage of being applicable to a wide variety of polymers. However, when halogen-based compounds are used, hydrogen halides along with other toxic compounds such as dioxins may be produced which could create a toxic environmental hazard. Thus, this approach to making a polymer flame retardant is far from ideal.

Endothermic materials, such as hydrated alumina or magnesium hydroxide, decompose and remove heat from the polymer and thus slow the combustion process. They are applicable to a variety of polymers, but their effect is limited. Moreover, because they are in the nature of a filler for the polymer they may impart undesirable characteristics to the polymer.

The two most prominent chemical classes of flame retardants are those based on halogen compositions and those based on phosphorus compositions. The mode of action of halogen-based flame retardants is thought to involve inhibition of gas-phase chain reactions. Phos- phorus-based flame retardants are less well understood. However, it is thought that this class of compounds can act both to alter the degradation pathway to produce less volatile gases as well and to effect a removal of flammable species from the gas phase. The effectiveness of a particular phosphorus composition depends upon the nature of the substrate polymer. For example, elemental phosphorus is an effective flame retardant only for oxygen-containing polymers such as polyesters, polyamides, and polyurethanes (see the following publications which are incorporated by reference: Granzow, A., Flame Retardation by Phosphorus Compounds, *Accounts of Chemical Research* 11(5), 177–183, 1978; Granzow, A. and Cannelongo, J. F., *J. Appl. Polym. Sci.*, 20, 589 et seq., 1976; Granzow, A., Ferrillo, R. G., and Wilson, A., *J. Appl. Polym. Sci.*, 21, 1657 et seq., 1977).

In other techniques, the polymer itself is flammable, but forms a heat insulative char. This approach of course, requires a suitable polymer and results in the destruction of the polymer.

Thus, such conventional approaches to making a polymer flame retardant have been unsuccessful in developing an ideal composition. Hence, there remains a continuing need for an effective approach to fire retardation that would be generally applicable to most polymers without the production of halogenated compounds.

McNeill and coworkers reported that they have examined the degradation of homopolymers of methacrylic acid and a variety of its salts and have shown that many of these salts will produce a large amount of non-volatile char. See I. C. McNeill and M. Zulfiqar, Polym. Degrad. Stab., 1, 89 et seq., 1979 incorporated herein by reference. The char that is formed from, for example, sodium methacrylate, reportedly consists of sodium carbonate with some elemental carbon. The article describing this work does not disclose the application of compositions to the surface of a polymer, nor does it mention the applicability of the compositions as fire retardants.

In other settings, however, techniques have been employed for grafting certain monomers to polymer substrates for purposes other than fire protection. Graft copolymers are comprised of a long "backbone" sequence of one monomer with one or more branches or "grafts" of a sequence of one or more units of a second monomer. Techniques for synthesizing graft copolymers are well known in the art and usually involve radical graft polymerization although approaches to making graft copolymers including anionic graft polymerization are known and used. For example, see Odian, G. in "Principles of Polymerization", 3rd Ed., Wiley-Interscience, pp. 719–745, 1991, incorporated herein by reference.

Grafting is performed typically to modify the surface properties of the substrate polymer. Thus, a polymer having a hydrophobic surface may be converted to one having a hydrophilic surface by grafting on a hydrophilic copolymer. Such grafted polymers find use in the fabric industry in altering the wetability nature of the fabric and/or in facilitating the dying of the fabric For example see Hebeish, A., Shalaby, S. E., and Bayzeed, A.M., *korlorisztikai Ertesito*, 2, 74 et seq., 1979; Tolado, G. C., Munari, S., and Calgari, S., *Chim. Ind. (Milan)*, 52, 759 et seq., 1970; Okada, T., and Sakadura, I., *Nippon Genshiryoku Kenkyusho Nempo, JAERI*, 5026, 63 et seq., 1970; all of which are incorporated herein by reference. None of these references mentions or appears to be applicable in a fire-retardant application.

The grafting of monomers onto various substrates has been reported by others. Vinyl monomers reportedly have been grafted onto cellulose or its derivatives. For example, see Ang, C. H., Garnett, J. L., Jankiewicz, S. V., and Sanger, D., *J. Am. Chem. Soc.*, 10, 141–154, 1982; Akira, R., Yasusato, and Atsushi, K., *Sen'i Gakkaishi*, 40, T445–T451, 1984; Bottom, R. A., Green, P., and Guthrie, J. T., *Polym Photochem*, 6, 11 et seq., 1985; all of which are incorporated herein by reference. The grafting of methacrylamide as well as methacrylic acid monomers onto styrene-butadiene-styrene plastic has been reported in Geuskens, G. and Kanda, M. N., Surface Modification of Polymers-I. Grafting Initiated by photo-generated hydroperoxides; *Eur. Polym. J.*,27, 877–879, 1991; and Geuskens, G. et al., Surface Modification of Polymers-II. Photo-Oxidation of SBS Containing Anthracene and Grafting Initiated by Photo-Generated Hydroperoxides, *Eur. Polym. J.*, 29, 351–355, 1993; and onto acrylonitrile-butadiene-styrene in Abdel-Razik, E. A., *Photochem. Photobiol. A Chem.*, 69, 121–124, 1992; all incorporated herein by reference. None of these references, however, reports the formation of polymer resins with a graft of salt of an acidic monomer onto the polymer or a concern for the char produced by the grafted layer on burning, desire for increasing char thickness, or use of the char layer as a fire retardant.

SUMMARY OF THE INVENTION

The present invention is, therefore, directed to a novel fire-retardant polymeric resin comprising a polymer to which is grafted a salt of a monomer composition in an amount effective as a fire retardant. The monomer composition comprises the salt of an acidic monomer, a mixture of such salts or a mixture of acidic monomers and their salts.

The present invention is also directed to a polymeric fire retardant additive comprising an elastomer to which is grafted a monomer composition which comprises the salt of an acidic monomer, a mixture of such salts or a mixture of acidic monomers and their salts.

Among the several advantages found to be achieved by the present invention, therefore, may be noted the provision of a polymeric resin having a fire-retardant surface layer of char-forming material affording fire protection of the underlying polymer; the provision of a fire-retardant surface layer of char-forming material that will decrease the peak heat release on exposure of the polymer to flammable conditions; the provision of such resins wherein the fire-retardant surface layer can be applied to a wide variety of polymers; and the provision of such polymeric resins wherein the surface layer on ignition does not produce halogenated by-products that are hazardous to the environment.

DETAILED DESCRIPTION OF THE PREFERRED EMBODIMENTS

In accordance with the present invention, it has been discovered that grafting the salt of an acidic monomer onto a polymer produces a fire retardant layer of char-forming material that provides a heat insulative layer to protect the underlying polymer. Surprisingly, the salt monomer provides for a greater char formation on exposure to high temperatures and so far greater thermal insulation of a polymer substrate than does the corresponding acid monomer. Moreover, the greater char formation provides a more substantial barrier over the polymer, creating a shield that reduces or prevents volatilization of the underlying polymer during a fire or a period of high heat.

In addition, whereas conventional techniques and compositions for fire protection typically require different approaches for different polymers, in the present invention, the particular chemical properties of the substrate polymer are of diminished importance in the fire retardation process allowing applicability to a wide variety of polymers. The fire-retardant compositions of this invention also avoid the environmental risks involved in production of halogenated compounds or toxic substances produced by prior art compositions that incorporate into the polymer halogens that on ignition produce halogenated compounds which can by themselves cause environmental problems.

Thus, the surprising discovery of enhanced char formation produced by the salt form of the graft monomer provides the polymer and plastic industries with a new and widely applicable approach for conferring the property of fire retardance to a polymer. The resin having this new fire retardant layer may be employed as a finished product or as an additive for further applications.

The fire-retardant compositions in this invention, therefore, have utility in a wide variety of industries and applications. The compositions can be use to protect the substrate plastic from damage due to fire. Furthermore, by retarding the fire, the substrate is less likely to burn and, thereby, cause further damage to its surroundings. Additionally for a given period of exposure to fire or high heat, the composition of this invention has been found to produce an acceptably low amount of smoke per unit mass. Hence, the health hazard as well as risk of secondary smoke damage is reduced when the resins of this invention are exposed to fire or high heat.

It is believed that the techniques of this invention can afford fire protection to virtually any polymer. However, particular application is noted for elastomers, blends of elastomers and thermoplastics, graft copolymers of elastomers and thermoplastics, thermoplastic elastomers, thermoplastic elastomer blends and mixtures thereof. Especially suitable polymers are those having a polymer backbone on which radical sites, generally electronegative sites such as hydroperoxides, may be formed. For example, polymers having sites of unsaturation that may be radicalized according to the scheme $RCH_2—CH=CHR \rightarrow RCH=CH—CH(OOH)R \rightarrow RCH=CH—H(O.)R+.OH$, as to be discussed below, are well suited to fire protection by this invention. Thus, polymers having a backbone including the alkenylene sequence $—CH_2CH=CH+$ within the repeating units, such as butadiene-based polymers, especially butadiene rubbers, are particularly appropriate. Accordingly, excellent fire protection can be afforded by the present invention to such polymers as acrylonitrile-butadiene-styrene (ABS), styrene-butadiene-styrene block copolymer (SBS) and K-resin.

Fire protection is afforded to such polymers by grafting certain monomers to the polymer. As noted above, acrylic acid, methacrylic acid and acrylamide have been reported to have been grafted onto ABS and SBS for purposes other than fire protection. See, Geuskens et al., *Euro. Polym J.*, Vol. 27, No. 9, supra; and Abdel-Razik, supra. Independent studies have reported on char formation associated with acrylic acid and methacrylic acid, and with the salts of poly(methacrylic acid). See the McNeill et al. articles identified above. It has now been discovered that when the acid monomers and their salts are grafted onto the polymer substrate, far greater char develops upon thermal degradation of the grafted monomer than develops upon thermal degradation of the ungrafted monomer or polymerized monomer, and thermal degradation of the salt produces far greater char than is produced upon thermal degradation of the corresponding acid, and the sodium salt of the acidic monomer has been found to produce the greatest amount of char of all the tested monomers.

Thus, the monomer to be grafted onto the polymer should be the salt of an acidic monomer. It is believed that the salt of almost any acidic monomer may be used. However, current grafting techniques are particularly suited to acidic vinyl monomers, such as acrylic acid, methacrylic acid, vinylsulfonic acid, phenylvinylphosphonic acid, and their salts. Any salts are believed to be suitable, although metal salts, such as iron, magnesium, nickel and, especially alkali metal salts, are preferred. A mixture of salts with more than one cation is also possible. As noted, sodium salts have been found to be especially efficacious.

A single type of monomer may be grafted to the polymer or, alternatively, a mixture of types of monomers may be grafted to the polymer. For example, the polymer may be grafted with sodium acrylate or a mixture of sodium acrylate and sodium methacrylate. Moreover, the monomer composition may contain some of the acid form of the monomer as well as the salt form. For instance, sodium methacrylate may be prepared by treating a methanolic solution of methacrylic acid with a methanolic solution of sodium hydroxide, resulting in less than a 100% conversion of the acid to the salt. Or, if the acid is converted to its salt after grafting, the base (e.g., sodium hydroxide) might not penetrate fully into the grafted coating or for some other reason not convert all of the acid to its base. Thus, the grafting mixture may comprise the acid form as well as the salt. Yet, far greater char still has been found to develop upon thermal degradation of layers grafted from such mixtures than develops upon thermal degradation of layers grafted from the acid alone.

A variety of grafting procedures may be employed. The noted Geuskens et al. references, for example, describe a method for grafting of acidic vinyl monomers to butadiene-containing polymers. This grafting technique is especially applicable to vinyl monomers and may be adapted to the present invention by substituting the salts of the acidic monomers (or a mixture of the acidic monomers and their salts) for the acids used by Geuskens et al. or by neutralization to form the salts after or during the grafting process. Thus, references herein to the salt of an acidic monomer being grafted to a polymer substrate does not require that the salt be formed before the grafting, but are to be understood in a broader sense in that at least some of the otherwise acid functional groups of the resulting grafted composition are terminated with a cation other than hydrogen. Other grafting methods are known in the art and may be more suitable in certain situations.

According to the technique based on the Geuskens et al. articles, therefore, polymer may be coated as follows. The polymer substrate is suspended in an organic solution (e.g., a methanolic solution) of anthracene until the anthracene migrates into the polymer. The polymer containing anthracene is then irradiated with a NEC lamp having an emission spectrum extending from about 350 to about 400 nm to produce hydroperoxides. The polymer bearing the hydroperoxides sites then is suspended in an aqueous solution of acidic monomer such as methacrylic acid at a temperature of about 100° C. to produce a grafted methacrylic acid layer. During this process, some of the monomer typically homopolymerizes in the solution. The homopolymer may be removed, for example, by boiling in water for about two hours. The coated polymer may then be suspended in dilute aqueous solution of base such as sodium hydroxide to convert the acid to its salt. Such neutralization, however, has been found typically to penetrate only partially into the newly-formed layer, thus effecting only partial neutralization.

A resin comprising a layer of grafted monomer over a polymer substrate is thus formed. The layer may be of a wide range of desired thicknesses. It has been found, however, that upon thermal degradation, a substantially increased amount of char residue remains as the amount of grafted monomer is increased from about 1% of the weight of the substrate to about 50% of the weight of the substrate, but that above that level, the amount of char residue does not increase significantly. Thus, it is preferred that the grafted monomer make up about 25 percent to about 70 percent of the weight of the substrate (corresponding to about 20 to about 40 percent by weight of the total resin), more preferably about 40 percent to about 60 percent of the weight of the substrate (corresponding to about 30 to about 37.5 percent by weight of the total resin).

The grafted layer comprises polymerized monomer covalently bonded to the radical sites on the polymer substrate. Thus, while reference is made herein, for example, to "grafted monomer" and "monomer grafted onto the polymer", it should be understood that the grafting process typically results in polymerization of the monomer or monomers in the monomer composition. Accordingly, the use herein of the phrases "grafted monomer", "monomer grafted onto the polymer" and the like are intended to refer to the resulting monomer-derived composition grafted onto the polymer substrate, even though the monomer may have polymerized during grafting. In other words, the reference to monomer in such cases is not intended to limit the grafted layer to those containing only unpolymerized monomer bonded to the substrate.

The fire retardant composition may be employed in any of a variety of applications that will be apparent to those skilled in the art. The composition may be useful as finished articles or as additives.

The char produced by thermal degradation of the polymerized monomer of such coating has even been found to be substantially greater than the polymerized monomer alone. Thus, it appears that the polymer substrate participates in the char-forming reaction. Moreover, while the limiting oxygen index of samples has been formed to be unaffected by the presence of grafted acidic monomer that has been charred, the limiting oxygen index has been found to be increased by the presence of grafted sodium salts of acidic monomers, indicating in the letter case that the underlying polymer was rendered more thermally stable. Moreover, the amount of smoke produced by resins of this invention during cone calorimetry according to ASTM E 1354 (see *Annual Book of ASTM Standards*, Vol. 4.07, 1990 to present, all of which are incorporated by reference) has been found to be less than 50% of that produced by the same polymer alone during such tests.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This example illustrates the grafting of methacrylic acid onto acrylonitrile-butadiene-styrene (ABS) and conversion of the acid to its sodium salt.

In order to graft a vinyl monomer onto a polymer, radical sites were generated on the polymer backbone. In this example polymeric hydroperoxides were formed upon UV irradiation of the polymer.

The ABS polymer containing 15 wt % acrylonitrile, 40 wt % buladiene and 45 wt % styrene was supplied by Japan Synthetic Rubber Co., Ltd. Films with thickness between 0.03 to 0.05 cm were prepared by thermal compression at 150° C. at a pressure of 4750 psi.

The polymer films were dipped into the methanolic solutions of anthracene at room temperature for several hours or minutes. Methanol, which is not a solvent for the polymer, was used as a solvent for anthracene in this example. The concentration of anthracene in the polymer film was determined by ultraviolet (UV) spectroscopy at 378 nm (E=8900 L mol-1 cm$^{-1}$) using a Perkin-Elmer Model 320 UV-Vis spectrophotometer.

Figure 1:
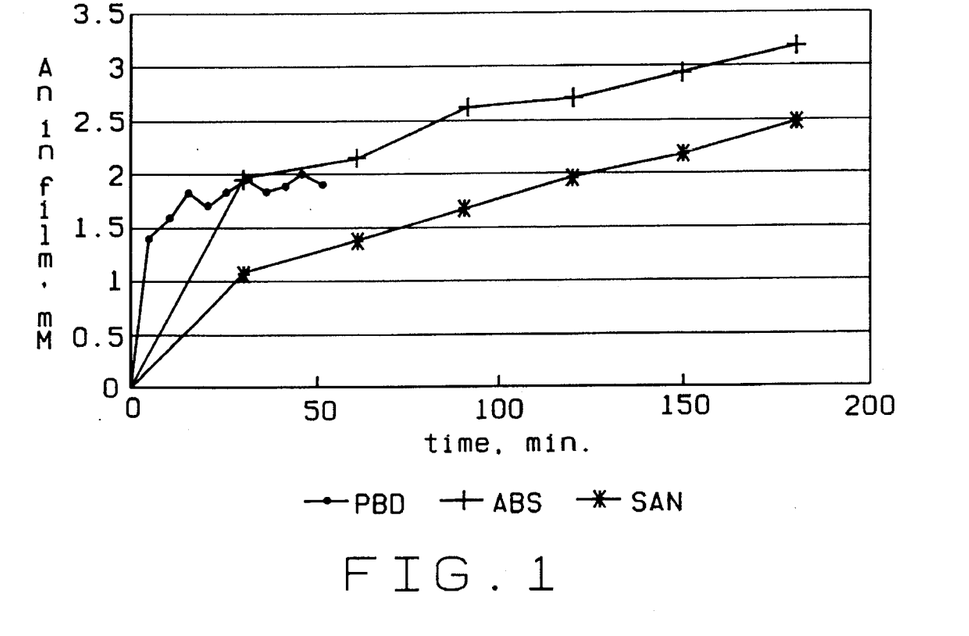
FIG. 1 is a graph illustrating the variation of concentration of anthracene in polymer films as a function of time.
Figure 2:
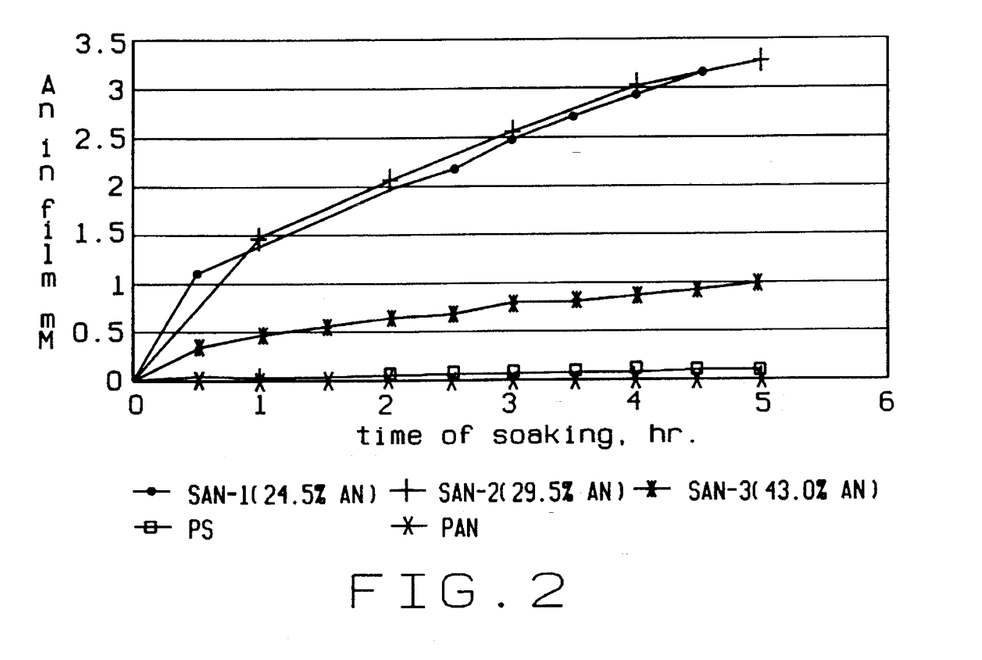
FIG. 2 is a graph illustrating the variation of concentration of anthracene in polymer films as a function of time and amount of acrylonitrile in polymer.

The absorption of anthracene into a polymer film from a solution depends on the polymer. ABS includes two different phases which consist of a rigid styrene-acrylonitrile (SAN) and a soft poly(butadiene) rubber (PBD) domain. The data for the absorption of anthracene in ABS, SAN, and PBD is shown in FIG. 1. The formation of cracks were visually observed in both SAN and ABS, but not in PBD, after soaking. The concentration of anthracene in PBD film quickly reached an equilibrium value after 20 minutes. On the other hand, anthracene was slowly taken up into SAN. The slope of the absorption curve for ABS is between that of PBD and SAN up to initial 30 minutes; there after it was very similar to the absorption curve for SAN. The anthracene might have penetrated into the PBD phase in ABS quickly and into SAN phase in ABS very slowly accompanied by the formation of crazing.

The polymer film was irradiated at various distances from a NEC lamp with an emission spectrum from 350 to 400 nm. The growth of polymeric hydroperoxide was followed by infrared spectroscopy (IR) at 3475 cm$^{-1}$ using a Mattson Galaxy Fourrier Transform infrared spectrometer.

Figure 3:
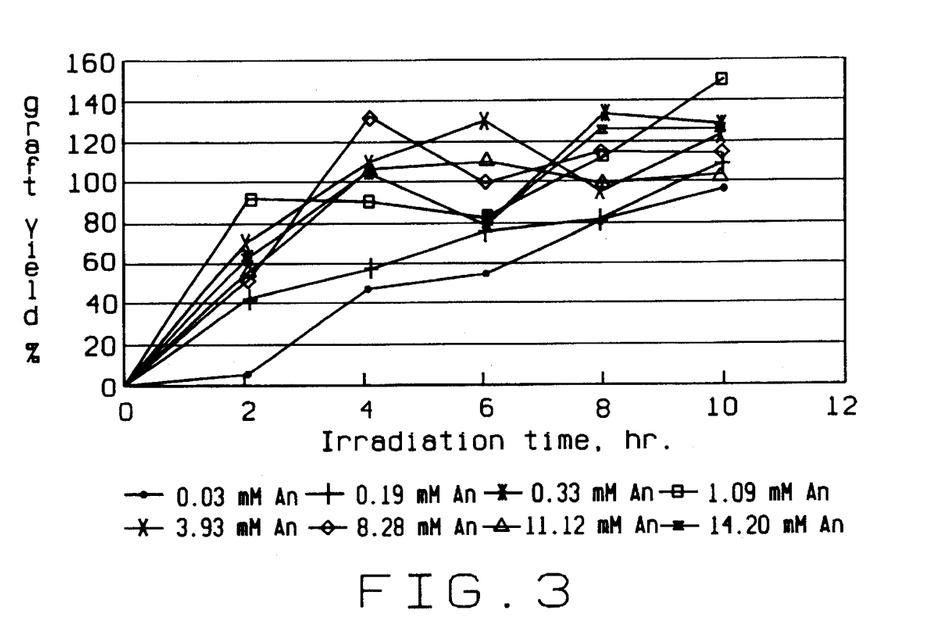
FIG. 3 is a graph illustrating the variation of graft yield as a function of time of irradiation and concentration of anthracene in films; the grafting reaction having been carried out for one hour at 100° C. and the MAA concentration being 5 vol %.

The generation of polymeric hydroperoxide in the ABS terpolymer after UV irradiation was identified by a new absorption at 3475 cm$^{-1}$ in the infrared spectrum. Grafting occurred by the formation of hydroperoxides in the butadiene portion of the polymer and no grafting was observed for the SAN system. The graft yield of methylacrylic acid (MAA) increased as the time of irradiation is increased but it was independent of the concentration of anthracene over a concentration range from 0.03 mM to 14.3 mM (FIG. 3). After several hours of irradiation, it is likely that all of the anthracene had been converted to the endoperoxide. It is believed that secondary reaction products were probably the cause of the formation of radicals which lead to the grafting reaction.

Figure 4:
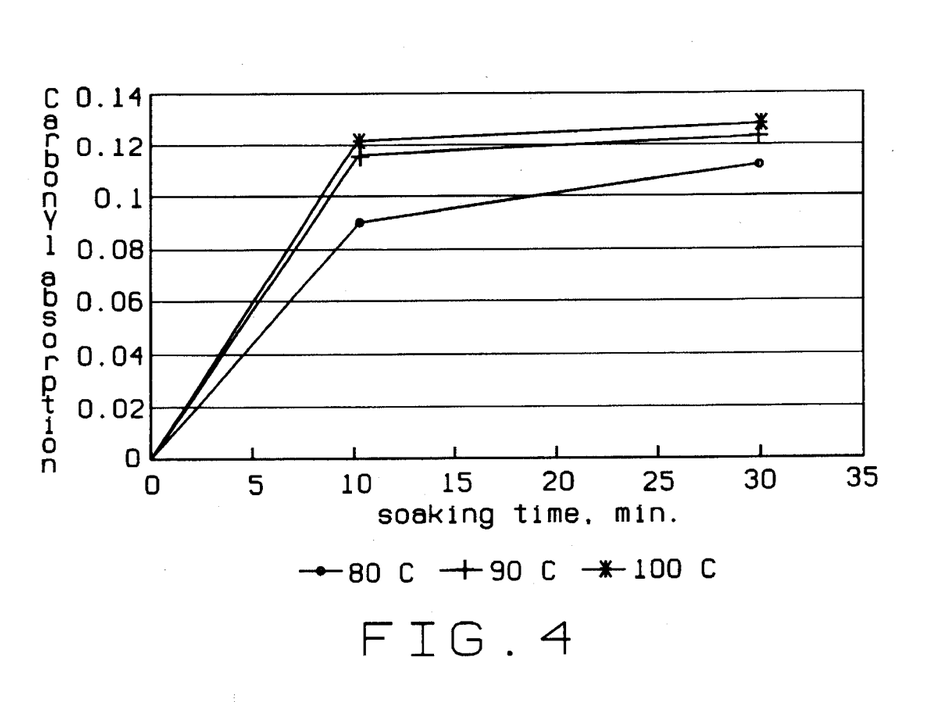
FIG. 4 is a graph illustrating absorption of methacrylic acid into ABS films as a function of time and temperature.

There was a significant dependence on the temperature at which the grafting reaction was performed; at temperatures below 100° C., no grafting occurred but at 100° C. there was grafting (FIG. 4). A possible explanation for the temperature dependence of the grafting reaction may be the ability of the methacrylic acid to penetrate the polymer. In addition, the concentration of methacrylic acid in the film was larger at 100° C. than at lower temperatures. This apparently indicates that a large monomer concentration was required within the film in order for grafting to occur. The lack of grafting at lower temperatures reflected the lower concentration of monomer in the film.

Figure 5:
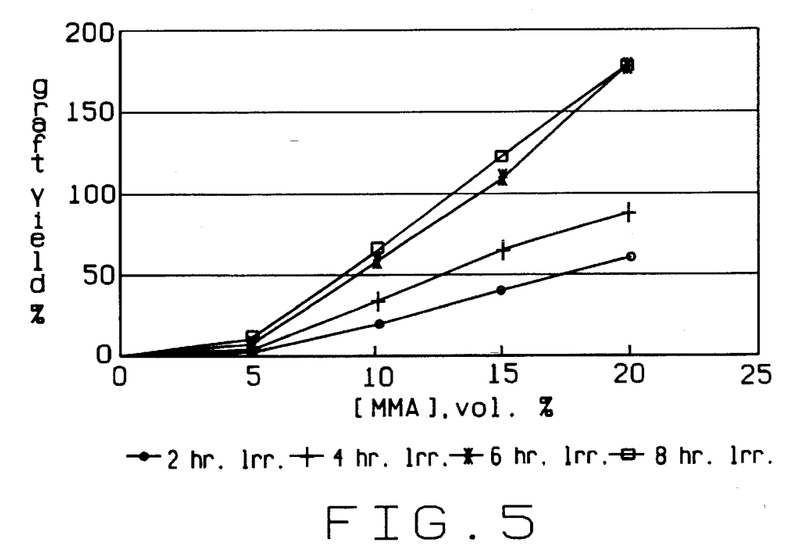
FIG. 5 is a graph illustrating the effect of time of irradiation and concentration of methacrylic acid on graft yield in the absence of anthracene; the grafting reaction having been carried out for one hour at 100° C.
Figure 6:
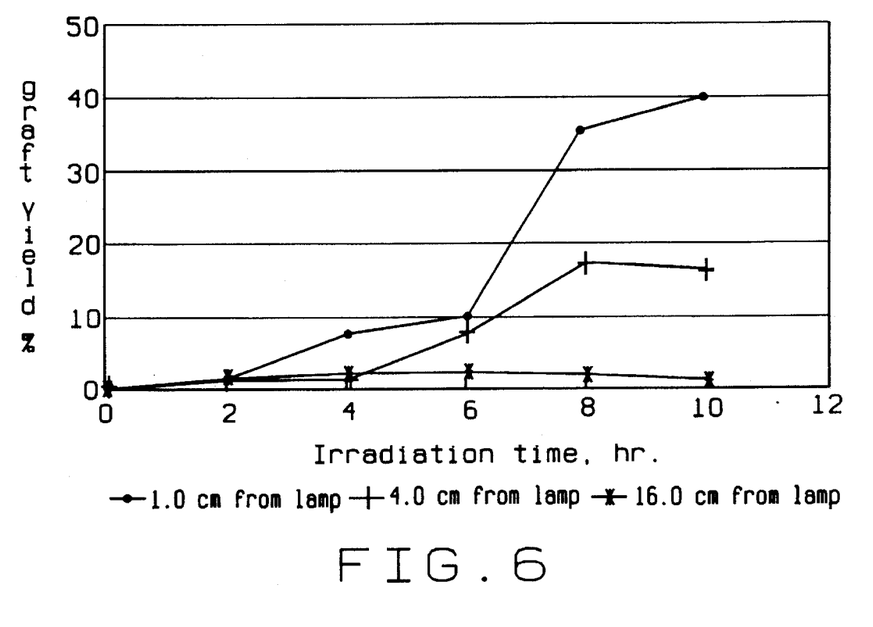
FIG. 6 is a graph illustrating the effect of time of irradiation and distance from UV lamp in the absence of anthracene on graft yield; the grafting reaction having been carried out for one hour at 100° C. and the MAA concentration was 5 vol %.

Grafting also occurred in the absence of anthracene, as shown in FIGS. 5 and 6. FIG. 5 presents the effect of the concentration of methacrylic acid on the grafting yield while FIG. 6 shows the effect of the intensity of UV irradiation, as measured by the distance between the sample and the UV lamp, both in the absence of anthracene. The graft yield was lower in the absence of anthracene but grafting still occurred. These no-anthracene grafting reactions were initiated by radicals formed upon UV irradiation.

Figure 7:
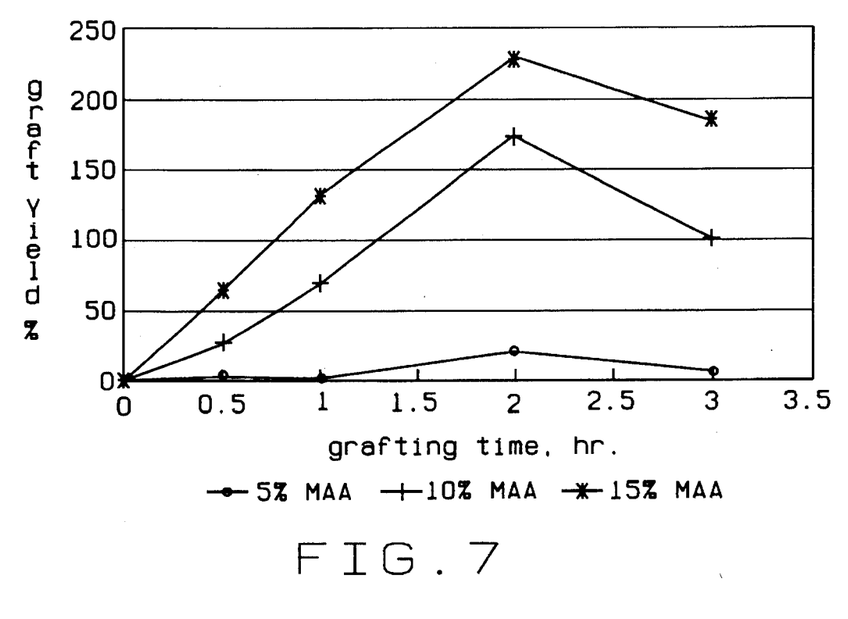
FIG. 7 is a graph illustrating the effect of time of grafting and concentration of methacrylic acid on graft yield in the absence of anthracene; the grafting reaction having been carried out for one hour at 100° C.

The dependence of the graft yield on the concentration of the monomer and time of grafting is shown in FIG. 7. As the monomer concentration increased, the graft yield increased. The graft yield was greater at 2 hours than after 1 hour, but decreased after a 3 hour reaction. It is possible that the concentration of methacrylic acid became so large after 3 hours that a water soluble polymer formed. A solid was recovered after evaporation of the aqueous solution after a 3 hour reaction; the infrared spectrum of this solid shows absorption in the nitrile region, indicating that the ABS was rendered partially soluble by the grafting of methacrylic acid.

The grafting reaction was carried out by suspending the irradiated ABS films in aqueous solutions of MAA monomer at various temperatures and times. The graft yield (GY) was determined by the following equation:

$$GY = \frac{B-A}{A} \times 100$$

where A and B are the weight of ABS before and after grafting respectively. In order to remove the homopolymer which was also produced in the reaction, the grafted ABS was washed in boiling water.

Two techniques were used to determine where grafting occurs: contacts angles and comparison of transmission and reflectance infrared spectroscopy. The contact angle that ha been measured in this laboratory for ABS is near 70°, this falls to near 40° for samples grafted with methacrylic acid at both 16% and 78% and for samples grafted with acrylamide at 0.16 and 8.8%; this decrease in contact angle indicated the surface was more hydrophilic and thus the graft was at the surface. When a grafted sample was examined by attenuated total reflectance infrared spectroscopy, the peaks due to methacrylic acid, especially the carbonyl absorption, were much stronger than those attributable to ABS, eg. the nitrile absorption. Thus, grafting occurred at the surface of the ABS film.

EXAMPLE 2

This example shows the thermogravimetric analysis of the grafted polymer resin.

Thermogravimetric analysis was carried out on a Omnitherm TGA 1000M. The scan rate was 20° C./min and the maximum temperature was 800° C.

Residues were determined for methacrylic acid (MAA) and sodium methacrylate (NaMAA) grafted on ABS. The graft yield in weight percent was calculated as in Example 1, above, and the range was from 0 to 100%.

Thermogravimetric analysis of the MAA graft showed a 5% residue at 800° C., while 55.4% was observed for NaMAA. These values were used in estimating the expected residue for a given graft yield %. From the residue values obtained for MAA and NaMAA, one would expect a sample grafted with methacrylic acid to give a relatively small yield of char compared to a sample which contains the sodium salt. The results of the TGA experiments on grafted ABS are shown in Table 1.

TABLE 1

TGA results for MAA and NaMAA grafted ABS

| % MAA | TGA residue at 800° C. | % NaMAA | TGA residue at 800° C. |
|---|---|---|---|
| 0 | 0 | 0 | 0 |
| 1 | 4.3 | 1 | 5.3 |
| 10 | 7.3 | 10 | 5.8 |
| 20 | 4.4 | 20 | 15.0 |
| 30 | 5.1 | 30 | 15.2 |
| 40 | 4.0 | 40 | 19.8 |
| 50 | 7.6 | 50 | 24.4 |
| 60 | 6.7 | 60 | 24.6 |
| 70 | 7.4 | 70 | 24.1 |
| 80 | 5.5 | 80 | 24.5 |
| 90 | 3.6 | 90 | 24.3 |
| 100 | 4.7 | 100 | 24.9 |

The presence of even a small amount of grafted monomer caused a significant increase in char yield; as the amount of grafted monomer increased, the char yield also increased but not as rapidly as might be expected based upon the value for a 1% grafted sample. Considering the grafted sample, since MAA gave a char yield of about one would expect that an ABS sample that had been grafted with 1% MAA would give a char yield of 5% of 1% or 0.05%. For the sodium salt, the expected char yield was 55% of 1%, or 0.55%. The char yields were significantly greater than this in each case, indicating that some ABS participated in the char-forming reaction.

The TGA residue reached a maximum value at about 50% graft yield and the residue was about 24% for a NaMAA grafted sample and 7% for a MAA grafted sample. The mass of a sample that had been 50% grafted was increased by 50%, thus the actual amount of MAA that had been added was 33.3%. The expected char yield for 50% grafted methacrylic acid was 1.8% while the expected amount for 50% grafted NaMAA was 18%. Again the actual char yield was significantly above the expected value again indicating that the ABS participated in the charring reaction. One possible explanation is that the surface layer of monomer forms a thermal barrier and prevents the loss of the underlying ABS polymer which would otherwise be volatile. Such a mechanism would be operable for grafts having a graft yield of up to 50%.

Above 50% graft yield the amount of residue plateaued for both MAA and NaMAA. At 100 graft yield of MAA, the amount of residue was about what would be expected based upon the known degradation of both MAA and ABS. For grafted NaMAA the residue was about ½ of what would be expected. For MAA, the constancy of char yield indicated that at thicknesses greater than some minimum value, there was no further increase in residue. For NaMAA, the plateau effect was due to the method of preparation, i.e., by treatment of the NaMAA grafted sample with sodium hydroxide. The MAA and NaMAA were also grafted onto the block copolymer styrene-butadiene-styrene (SBS) and the polymer, K-resin. The TGA results were similar to those obtain for ABS and these are shown in tables 2 and 3.

TABLE 2

TGA results for grafted SBS

| % MAA | residue at 800° C. | % NaMAA | residue at 800° C. |
|---|---|---|---|
| 0 | 0 | 0 | 0 |
| 10 | 3.1 | 10 | 8.7 |
| 20 | 4.6 | 20 | 13.6 |
| 30 | 4.3 | 30 | 16.0 |
| 40 | 3.9 | 40 | 25.0 |
| 50 | 4.5 | 50 | 17.0 |
| 60 | 5.8 | 60 | 19.0 |
| 70 | 4.3 | 70 | 23.9 |
| 80 | 4.8 | 80 | 22.1 |
| 90 | 4.5 | 90 | 25.4 |
| 100 | 5.9 | 100 | 27.2 |

TABLE 3

TGA results for grafted K-resin

| % MAA | residue at 800° C. | % NaMAA | residue at 800° C. |
|---|---|---|---|
| 0 | 1.6 | 0 | 3.5 |
| 10 | 4.2 | 10 | 13.9 |
| 20 | 4.6 | 20 | 19.8 |
| 30 | 3.8 | 30 | 21.6 |
| 40 | 4.7 | 40 | 14.5 |
| 50 | 5.3 | 50 | 17.5 |

TABLE 3-continued

TGA results for grafted K-resin

| % MAA | residue at 800° C. | % NaMAA | residue at 800° C. |
|---|---|---|---|
| 60 | 5.9 | 60 | 9.8 |
| 70 | 6.6 | 70 | 17.6 |
| 80 | 5.6 | 80 | 12.8 |
| 90 | 7.8 | 90 | 18.4 |
| 100 | 5.1 | 100 | |

In addition, the sodium salt of vinylsulfonic acid was grafted onto ABS and a TGA residue value of 7% was obtained for the graft yield of 6%.

Figure 8:
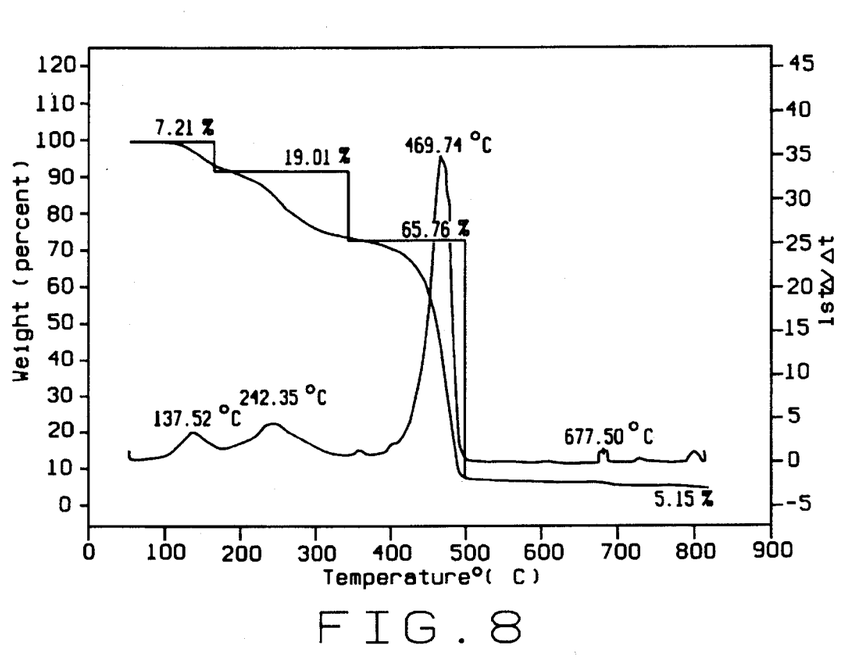
FIG. 8 is a graph illustrating the TGA of methacrylic acid graft; the scan rate being 20° C. per minute and maximum temperature being 800° C.
Figure 9:
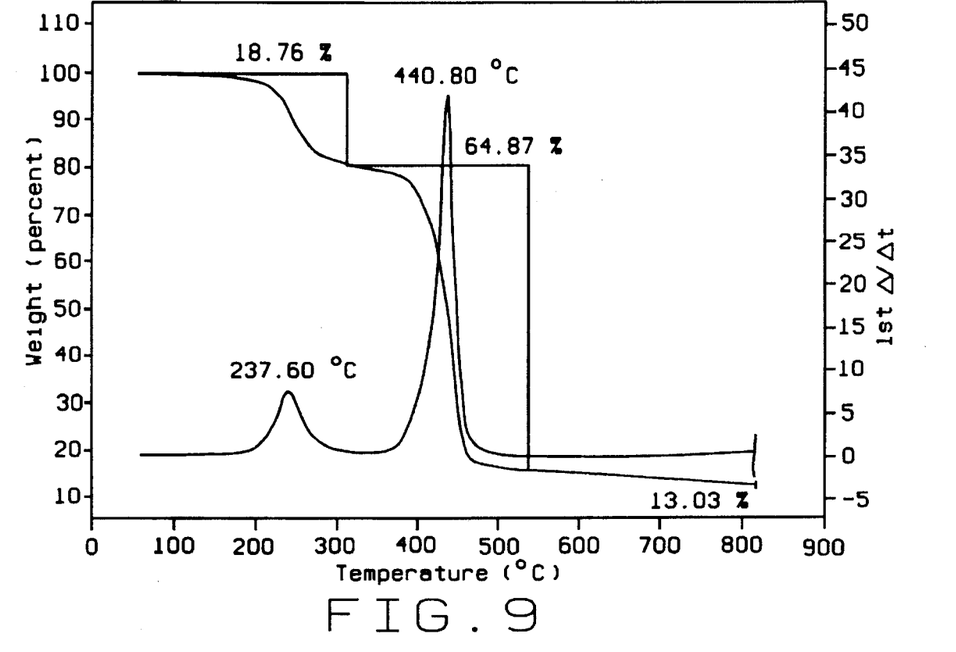
FIG. 9 is a graph illustrating the TGA of sodium methacrylate graft prepared from the acid by treatment with sodium hydroxide; the scan rate being 20° C. per minute and maximum temperature being 800° C.
Figure 10:
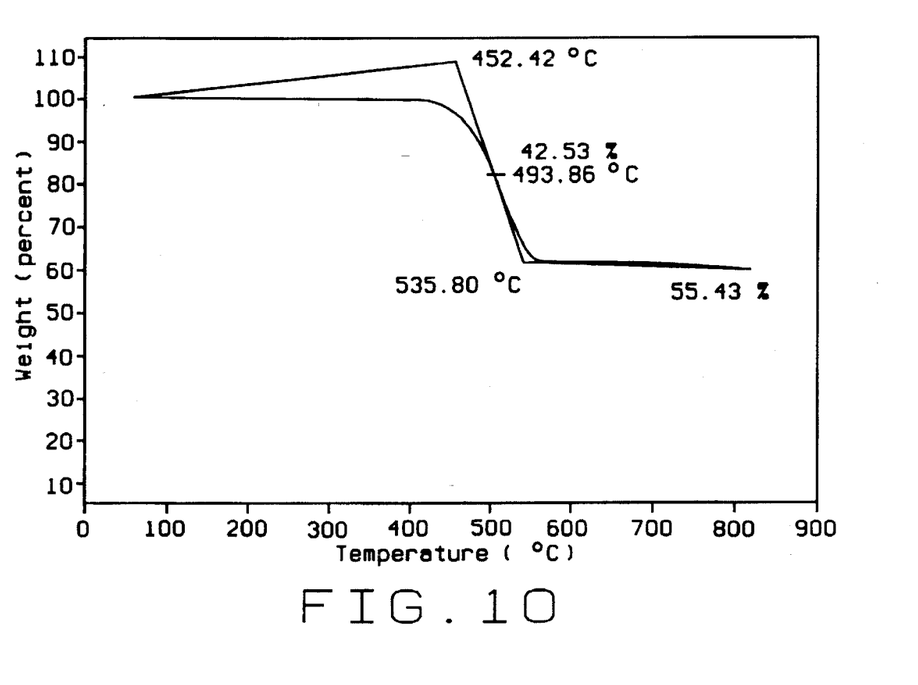
FIG. 10 is a graph illustrating the TGA of sodium methacrylate graft prepared by the polymerization of sodium methacrylate; the scan rate being 20° C. per minute and maximum temperature being 800° C.

The degradation of NaMAA prepared by polymerization of NaMAA differed from the degradation of NaMAA prepared from MAA. The TGA curves for MAA, NaMAA prepared from the acid and NaMAA prepared by polymerizaton of NaMAA are shown in FIGS. 8, 9, and 10, respectively. The degradation of MAA began at low temperatures with the loss of water and the formation of an anhydride. Degradation commenced a little above 100° C. and a second step change in degradation occurred at approximately 200° C. (FIG. 8). The sodium containing polymer prepared from the acid did not show the first degradation as was also the case for the polymer prepared from NaMAA (FIGS. 9 and 10). The degradation beginning at 200° C. was present for both the acid monomer and the sodium salt prepared from the acid monomer but absent for the polymer prepared from NaMAA. Thus, penetration of sodium hydroxide did not proceed throughout the polymer and only a portion of the acid was converted to the sodium salt. The non-volatile residue for the polymer prepared from the acid was 13% while that in the polymer prepared from NaMAA was 55%. Because sodium hydroxide did not penetrate the entire sample, the graft layer was a mixture of MAA and NaMAA.

Figure 11:
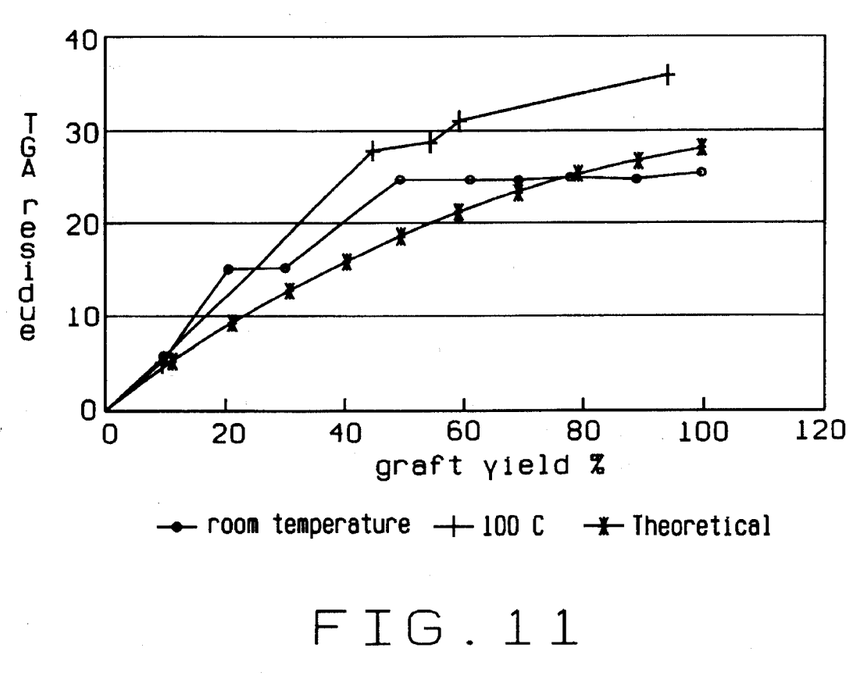
FIG. 11 is a graph illustrating the TGA of sodium methacrylate graft prepared by treatment with sodium hydroxide at room temperature and at 100° C.; the scan rate being 20° C. per minute and the maximum temperature being 800° C.

In an effort to produce a more complete conversion of the acid to its sodium salt, the samples were heated in an aqueous solution of sodium hydroxide at 100° C. In some cases the integrity of the sample was destroyed by this treatment but, on the whole, the TGA results showed an increased residue. The TGA residue at 800° C. for samples that were converted to the sodium salt at room temperature and at 100° C., as well as the residue expected from the amount of grafted NaMAA are shown in FIG. 11 as a function of the amount of grafting.

Other salts also proved effective and accordingly iron, magnesium, and nickel salts were prepared and TGA experiments performed. The residues for these salts invariably were lower than those obtained for the sodium salts, apparently because of incomplete conversion to the salt. At 50% grafting the residues for the sodium salt was 25%, but the residues for $Mg^{2+}$, $Ni^{2+}$, and $Fe^{2+}$ were between 6.5 and 8%.

EXAMPLE 3

This example illustrates the determination of limiting oxygen index for MAA and NaMAA grafts.

Determination of limiting oxygen concentration is a common testing procedure in which, typically, the sample is burned in a vertically downward mode in an oxygen/nitrogen atmosphere of controlled composition. (See the following publication which is incorporated by reference: Fenimore, C. P. and Martin, F. J., NBS Symposium "The Mechanics of Pyrolysis, Oxidation and Burning of Organic Materials", Natl. Bur. Std. (U.S.) Spec. Publ., No. 357, 159 et seq., 1972). A more stringent test was used in that the sample was ignited from the bottom and, thus, bathed in the flame. Typical results by bottom ignition give values for oxygen index that are approximately 4 to 5 volume percent lower than values obtained from top ignition. Following ignition, the oxygen content of the gas mixture was gradually reduced until the atmosphere was no longer able to support the combustion of the sample and extinction occured. The concentration of oxygen measured as volume percent of the mixture at which extinction occurs was termed the limiting oxygen index (LOI).

Results from measurements of LOI for grafted polymers supported the conclusion that the formation of a charrable layer on the surface of the polymer rendered the underlying polymer more thermally stable. The data for MAA and NaMAA grafted onto ABS are shown in Table 4.

TABLE 4

LOI Data for ABS grafted with MAA and NaMAA

| % graft | NaMAA | MAA |
|---|---|---|
| 0 | 18 | 18 |
| 10 | 18 | 18 |
| 40 | 19 | 17 |
| 70 | 21 | 17 |
| 100 | 23 | 18 |

The LOI increased as the amount of NaMAA increased. The increase was not as large as expected and this is presumed to be because grafting was done on only one side of the sample.

Similar results were obtained from grafts of MAA and NaMAA on SBS and K-resin (tables 5 and 6)

TABLE 5

LOI data for SBS grafted with MAA or NaMAA

| % MAA | LOI | % NaMAA | LOI |
|---|---|---|---|
| 0 | 15 | | |
| 10 | 15 | 10 | 17 |
| 30 | 17 | 30 | 18 |
| 60 | 18 | 60 | 19 |
| 90 | 18 | 90 | 20 |
| 140 | 18 | 140 | 21 |

TABLE 6

LOI data for K-resin grafted with MAA or NaMAA

| % MAA | LOI | % NaMAA | LOI |
|---|---|---|---|
| 0 | 15 | | |
| 20 | 17 | 20 | 18 |
| 30 | 17 | 30 | 19 |
| 45 | 17 | 45 | 19 |
| 55 | 18 | 55 | 19 |
| 80 | 18 | 80 | 20 |
| 160 | 19 | 160 | 21 |

EXAMPLE 4

This example illustrates the combustion properties of ABS grafted with NaMAA and ABS alone using cone calorimetry. Cone calorimetry according to ASTM E 1354 was performed using a Stanton Redcroft/PL Thermal Sciences instrument at 25 KW/m² in the horizontal orientation.

Samples having a thickness of 0.25" and a mass of 0.75 gm were mounted using the edge retainer frame and wire grid. Exhaust flow was set at 24 L/sec. and the spark was continuous until the sample ignited. Cone calorimetry data indicated the NaMAA graft imparts the property of flame retardance to ABS. The data for unmodified ABS and a sample of ABS grafted with NaMAA are shown in table 7.

TABLE 7

Cone calorimetry for unmodified and grafted ABS

|  | unmodified ABS | 21% NaMAA |
| --- | --- | --- |
| Time to ignition, sec | 285 | 460 |
| peak heat release rate, kW/m$^2$ | 901 | 259 |
| time to peak HRR, sec | 530 | 1130 |
| Time to burnout, sec | 670 | 1400+ |
| Energy release through 670 sec, kJ | 1700 | 150 |
| Mass loss rate, mg/min | 170 | 40 |
| Percent mass loss |  |  |
| @ 670 sec | 83 | 5 |
| @ 20 min | 92 | 37 |
| Specific extinction area, m$^2$/kg |  |  |
| average from ignition through 670 sec | 790 | 620 |
| average from ignition through 20 min | 798 | 826 |
| Extinction area (total smoke) m$^2$ |  |  |
| produced through 670 sec | 49 | 3.1 |
| produced through 20 min | 58 | 29 |

These data indicate that the combustion properties of ABS were dramatically altered by the addition of 21% NaMAA as a surface graft layer. Time to ignition at 25 kW/m$^2$ incident flux was almost doubled as was the time to reach maximum rate of heat release. The peak value of the heat release rate and the mass loss rate were each lowered by factors of over three. Judging from the sharp decreases in the heat release rate and the mass loss rate, the unmodified ABS was essentially consumed by 670 seconds from the onset of irradiation. At a similar point in time the modified material had lost only 5% of its mass. Only 36% of the modified ABS was consumed in the entire 20 minute test, indicating that the graft increased char formation. The specific extinction area, which relates to smoke produced per unit mass lost, was similar for the two materials. This, however, indicated a substantial reduction in the rate of production of smoke with the grafted polymer. Materials with low mass losses will generate less smoke than materials having similar specific extinction areas but higher mass losses. This effect is sizeable in the case of the modified ABS tested here. At 670 seconds, by which time the unmodified ABS was essentially consumed, the grafted ABS had generated only one-sixteenth as much total smoke. Even after irradiating the modified ABS for twice as long (20 minutes), it had only produced one-half as much smoke.

Samples that have lesser amounts of grafted material were also tested. For 3% and 4% NaMAA grafted samples, the time to ignition was essentially unchanged while the peak heat release rate showed little decrease.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A fire retardant polymeric resin comprising a polymer having grafted thereto a fire retardant effective amount of a monomer composition selected from the group consisting of salts of acidic monomers, mixtures of salts of acidic monomers, and mixtures of acidic monomers and salts thereof.

2. A resin according to claim 1 wherein said acidic monomers are acidic vinyl monomers.

3. A resin according to claim 2 wherein said acidic vinyl monomers are selected from the group consisting of acrylic acid, methacrylic acid, vinylsulfonic acid and phenylvinylphosphonic acid.

4. A resin according to claim 1 wherein said salts are alkali metal salts.

5. A resin according to claim 4 wherein said alkali metal salts are sodium salts.

6. A resin according to claim i wherein said polymer comprises an elastomer, a blend of an elastomer and a thermoplastic, a graft copolymer of an elastomer and a thermoplastic, a thermoplastic elastomer, a thermoplastic elastomer blend, or a mixture thereof.

7. A resin according to claim 6 wherein said resin comprises acrylonitrile-butadiene-styrene grafted copolymer having a salt of acrylic acid or methacrylic acid grafted thereto.

8. A resin according to claim 7 wherein said salt is an alkali metal salt.

9. A resin according to claim 8 wherein said alkali metal salt is a sodium salt.

10. A resin according to claim 2 wherein said salts are sodium salts.

11. A resin according to claim 3 wherein said salts are sodium salts.

12. A resin according to claim 1 wherein said monomer composition makes up about 20% by weight to about 40% of the resin.

13. A resin according to claim 1 wherein the amount of smoke produced by such resin during cone calorimetry according to ASTM E 1354-90 is less than 50% of the smoke produced by said polymer during cone calorimetry.

14. A polymeric fire retardant additive comprising an elastomer having grafted thereto a monomer composition selected from the group consisting of salts of acidic monomers, mixtures of salts of acidic monomers, and mixtures of acidic monomers and salts thereof.

15. An additve according to claim 14 wherein said acidic monomers are selected from the group consisting of acrylic acid, methacrylic acid, vinylsulfonic acid and phenylvinylphosphonic acid.

16. An additive according to claim 14 wherein said salt is an alkali metal salt.

17. An additive according to claim 15 wherein said alkali metal salt is a sodium salt.

18. An additive according to claim 14 comprising a butadiene rubber having an salt of acrylic acid or methacrylic acid grafted thereto.

19. An additive according to claim 17 wherein said salt is an alkali metal salt.

20. An additive according to claim 18 wherein said alkali metal salt is a sodium salt.

* * * * *